(12) United States Patent
Gozzo et al.

(10) Patent No.: US 11,070,671 B1
(45) Date of Patent: Jul. 20, 2021

(54) MIDDLEWARE PIPELINE THAT PROVIDES ACCESS TO EXTERNAL SERVERS TO FACILITATE CUSTOMER-SUPPORT CONVERSATIONS

(71) Applicant: Zendesk, Inc., San Francisco, CA (US)

(72) Inventors: Michael Gozzo, Montreal (CA); Andrew Lavers, Pointe-Claire (CA); Jean-Philippe J. Joyal, Montreal (CA); Michael J. Spensieri, Montreal (CA)

(73) Assignee: Zendesk, Inc., San Francisco, CA (US)

( * ) Notice: Subject to any disclaimer, the term of this patent is extended or adjusted under 35 U.S.C. 154(b) by 0 days.

(21) Appl. No.: 15/930,335

(22) Filed: May 12, 2020

Related U.S. Application Data

(60) Provisional application No. 63/023,588, filed on May 12, 2020.

(51) Int. Cl.
| | |
|---|---|
| *H04M 3/00* | (2006.01) |
| *H04M 3/51* | (2006.01) |
| *H04L 12/58* | (2006.01) |
| *G06Q 30/00* | (2012.01) |

(52) U.S. Cl.
CPC .......... *H04M 3/5141* (2013.01); *H04L 51/02* (2013.01); *H04L 51/12* (2013.01); *H04M 3/5175* (2013.01); *G06Q 30/016* (2013.01)

(58) Field of Classification Search
CPC ..... H04M 3/5141; H04L 51/02; G06Q 30/016
USPC ....... 379/265.01–265.14, 266.01–266.1, 309
See application file for complete search history.

(56) References Cited

U.S. PATENT DOCUMENTS

| | | | | |
|---|---|---|---|---|
| 2004/0139322 | A1* | 7/2004 | Kaler | H04L 29/06 713/170 |
| 2012/0324069 | A1* | 12/2012 | Nori | G06F 9/5066 709/222 |
| 2013/0006602 | A1* | 1/2013 | Zhu | G06F 40/58 704/2 |
| 2014/0149603 | A1* | 5/2014 | Park | H04L 67/02 709/238 |
| 2016/0127282 | A1* | 5/2016 | Nezarati | G06F 3/0481 715/758 |
| 2018/0341685 | A1* | 11/2018 | Indyk | G06F 16/90332 |
| 2019/0034414 | A1* | 1/2019 | Kim | G06F 16/3329 |

(Continued)

*Primary Examiner* — William J Deane, Jr.
(74) *Attorney, Agent, or Firm* — Park, Vaughan, Fleming & Dowler LLP

(57) ABSTRACT

The disclosed embodiments relate to a system that facilitates accessing external servers to process messages during customer-support conversations in an online customer-support system. During operation, the system receives a message from a sender while the message is in transit between the sender and a receiver during a customer-support conversation, wherein the customer-support conversation is between a customer and a responsive entity, and wherein the customer-support conversation relates to an issue the customer has with a product or a service used by the customer. Next, the system feeds the message through a pipeline of processors, wherein each processor in the pipeline is configured to make a call to an associated external server to perform an operation on the message before forwarding the message to a subsequent stage of the pipeline. Finally, when the message finishes transiting the pipeline, the system forwards the message to the receiver.

29 Claims, 9 Drawing Sheets

(56) References Cited

U.S. PATENT DOCUMENTS

2019/0370615 A1* 12/2019 Murphy ............. G06Q 10/0633
2020/0058073 A1* 2/2020 Diedrich ................ G06Q 40/02

* cited by examiner

| Action | Syntax |
|---|---|
| Pass control to next integration | %((switchboard:passControl))% |
| Pass control to named integration | %((switchboard:passControl:agent))% |
| Offer control to next integration | %((switchboard:offerControl))% |
| Offer control to named integration | %((switchboard:offerControl:bot))% |
| Take control of the conversation | %((switchboard:takeControl))% |

FIG. 4

MIDDLEWARE PIPELINE THAT PROVIDES ACCESS TO EXTERNAL SERVERS TO FACILITATE CUSTOMER-SUPPORT CONVERSATIONS

RELATED CASES

This application claims the benefit of U.S. Provisional Application No. 63/023,588, entitled "Facilitating Customer-Support Conversations" by inventors Michael Gozzo, Andrew Lavers, Jean-Philippe J. Joyal, Michael J. Spensieri, Francois U. Brien and Marc-Antoine Leblond filed on 12 May 2020, which is hereby incorporated by reference herein. This application is also related to pending U.S. patent application Ser. No. 15/930,339, entitled "Handing Off Customer-Support Conversations between a Human Agent and a Bot without Requiring Code Changes," by the inventors Michael Gozzo, Andrew Lavers, Jean-Philippe J. Joyal, Michael J. Spensieri, Francois U. Brien and Marc-Antoine Leblond, filed on the same day as the instant application, which is hereby incorporated by reference herein.

BACKGROUND

Field

The disclosed embodiments generally relate to the design of customer-support resources for e-commerce systems. More specifically, the disclosed embodiments relate to a customer-support system with a middleware pipeline that provides access to external servers to facilitate customer-support conversations.

Related Art

As electronic commerce continues to proliferate, customers are beginning to use online customer-support resources to help resolve problems, and to obtain information related to various products or services. These online customer-support resources are designed to help customers by: providing helpful information to the customers; or facilitating interactions with customer-support agents. When designed properly, these online customer-support resources can automate many customer-support interactions, thereby significantly reducing a company's customer-support costs.

In an automated customer-support system, it is often advantageous to have a conversation with the customer. For this reason, online customer-support systems often include mechanisms that facilitate conversations between a customer and a customer-support agent (or a software bot) to help resolve a customer's problem. During such conversations, it is often beneficial to make use of external servers (such as third-party servers) to perform various operations on messages in the conversations. For example, an external server can be used to translate text in a message between Spanish and English. In another example, an external server can be used to mask out sensitive personally identifiable information (PII), such as credit card numbers or Social Security numbers, in a message. In existing customer-support systems, providing access to such external servers typically involves a significant amount of time-consuming customized coding by developers of the customer-support system. Moreover, the resulting customized code may need to be frequently updated to accommodate changing system requirements.

Hence, what is needed is a mechanism that facilitates using such external servers to perform operations on messages in a customer-support conversation.

SUMMARY

The disclosed embodiments relate to a system that facilitates accessing external servers to process messages during customer-support conversations in an online customer-support system. During operation, the system receives a message from a sender while the message is in transit between the sender and a receiver during a customer-support conversation, wherein the customer-support conversation is between a customer and a responsive entity, and wherein the customer-support conversation relates to an issue the customer has with a product or a service used by the customer. Next, the system feeds the message through a pipeline of processors, wherein each processor in the pipeline is configured to make a call to an associated external server to perform an operation on the message before forwarding the message to a subsequent stage of the pipeline. Finally, when the message finishes transiting the pipeline, the system forwards the message to the receiver.

In some embodiments, external servers can perform the following operations on a message: performing a language translation operation on text in the message; retrieving additional information associated with the message from one or more sources; and masking out personally identifiable information (PII) in the message.

In some embodiments, the responsive entity in the customer-support conversation includes a customer-support agent, or a software bot.

In some embodiments, the message comprises a Hypertext Transfer Protocol (HTTP) message or event.

In some embodiments, while processing the message, each processor in the pipeline may retrieve additional information associated with the customer-support conversation and/or the customer.

In some embodiments, when a processor makes a call to an external server, the processor also communicates a secret to the external server, wherein the secret enables the external server to verify the origin of the call.

In some embodiments, a processor in the pipeline may selectively halt the message so that the message does not continue propagating through the pipeline.

In some embodiments, when a processor makes a call to an external server, the processor also communicates a one-time use "nonce" to the external server, wherein the nonce enables the external server to forward the message to a subsequent stage of the pipeline.

In some embodiments, each processor in the pipeline can attach metadata to the message before forwarding the message to a subsequent stage of the pipeline.

In some embodiments, after the message finishes transiting the pipeline, in addition to forwarding the message to the receiver, the system forwards the message to one or more passive listeners.

In some embodiments, prior to receiving the message, the system additionally exposes an application programming interface (API), which enables an integrator to: create a processor; and update a pipeline to include the processor at a specific location in the pipeline.

In some embodiments, the API defines calls for the following operations: creating a processor; listing processors; getting a processor; updating a processor; deleting a processor; listing pipelines; updating a pipeline; and continuing a message from a processor to a subsequent stage in the pipeline.

BRIEF DESCRIPTION OF THE FIGURES

FIG. 4 presents a table of exemplary conversation-control commands in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
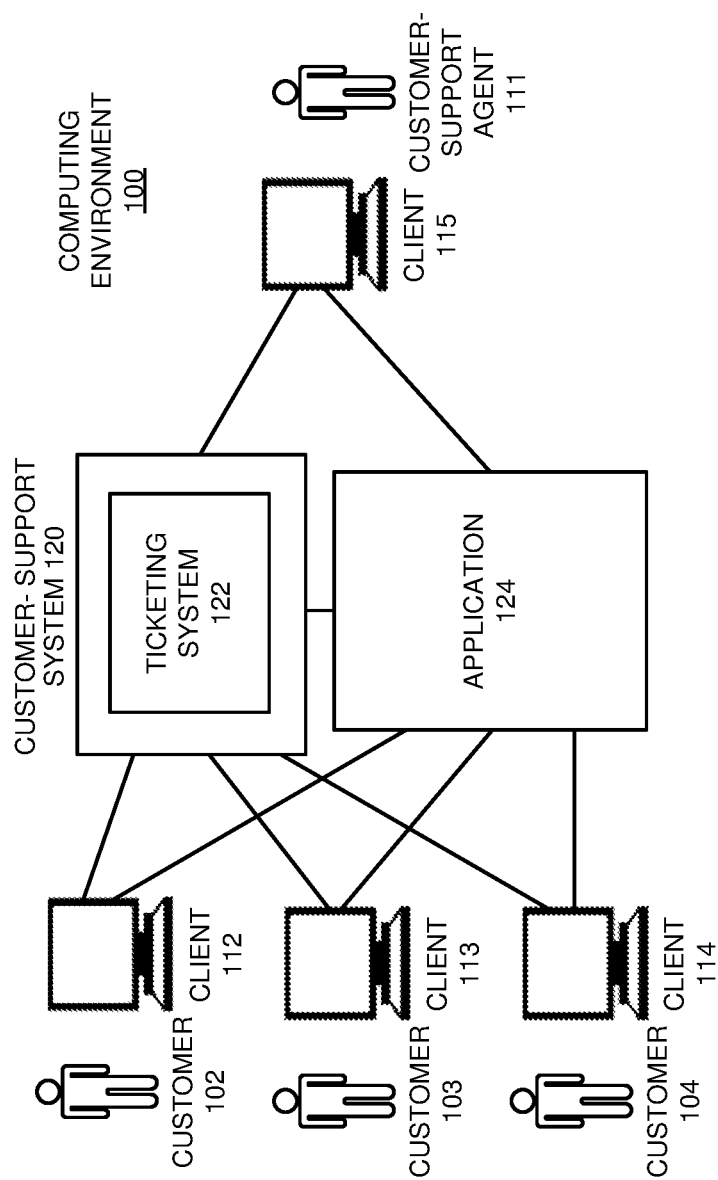
FIG. 1 illustrates a computing environment, which includes an application and an associated customer-support system, in accordance with the disclosed embodiments.

Before discussing the above-described system that facilitates customer-support conversations in more detail, we first describe an exemplary computing environment in which it operates. FIG. 1 illustrates a computing environment that facilitates customer-support conversations. At the highest level, computing environment 100 includes an application 124 and a customer-support system 120. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems with or questions about application 124, they can access customer-support system 120 to obtain help dealing with issues, which can include various problems and questions. For example, a user of accounting software may need help using a feature of the accounting software, or a customer of a website that sells sporting equipment may need help cancelling an order that was erroneously entered. This help may be provided by a customer-support agent 111 who operates a client computing system 115 and interacts with customers 102-104 through customer-support system 120. This help may also involve automatically suggesting helpful articles that the customer can read to hopefully resolve the problem or question. Note that customer-support agent 111 can access application 124 (either directly or indirectly through customer-support system 120) to help resolve an issue.

In some embodiments, customer-support system 120 is not associated with computer-based application 124, but is instead associated with another type of product or service that is offered to a customer. For example, customer-support system 120 can provide assistance with a product, such as a television, or with a service such as a package-delivery service.

Customer-support system 120 organizes customer issues using a ticketing system 122, which generates tickets to represent each customer issue. Ticketing systems are typically associated with a physical or virtual "help center" (or "help desk") for resolving customer problems. Ticketing system 122 comprises a set of software resources that enable a customer to resolve an issue. Specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem;

(3) agent information for one or more customer-support agents who are interacting with the customer; (4) email and other electronic communications about the problem (which, for example, can include a question posed by a customer about the problem); (5) information about telephone calls associated with the problem; (6) timeline information associated with customer-support interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-support agent.

The structure of customer-support system 120 is described in further detail below.

Customer-Support System

Figure 2:
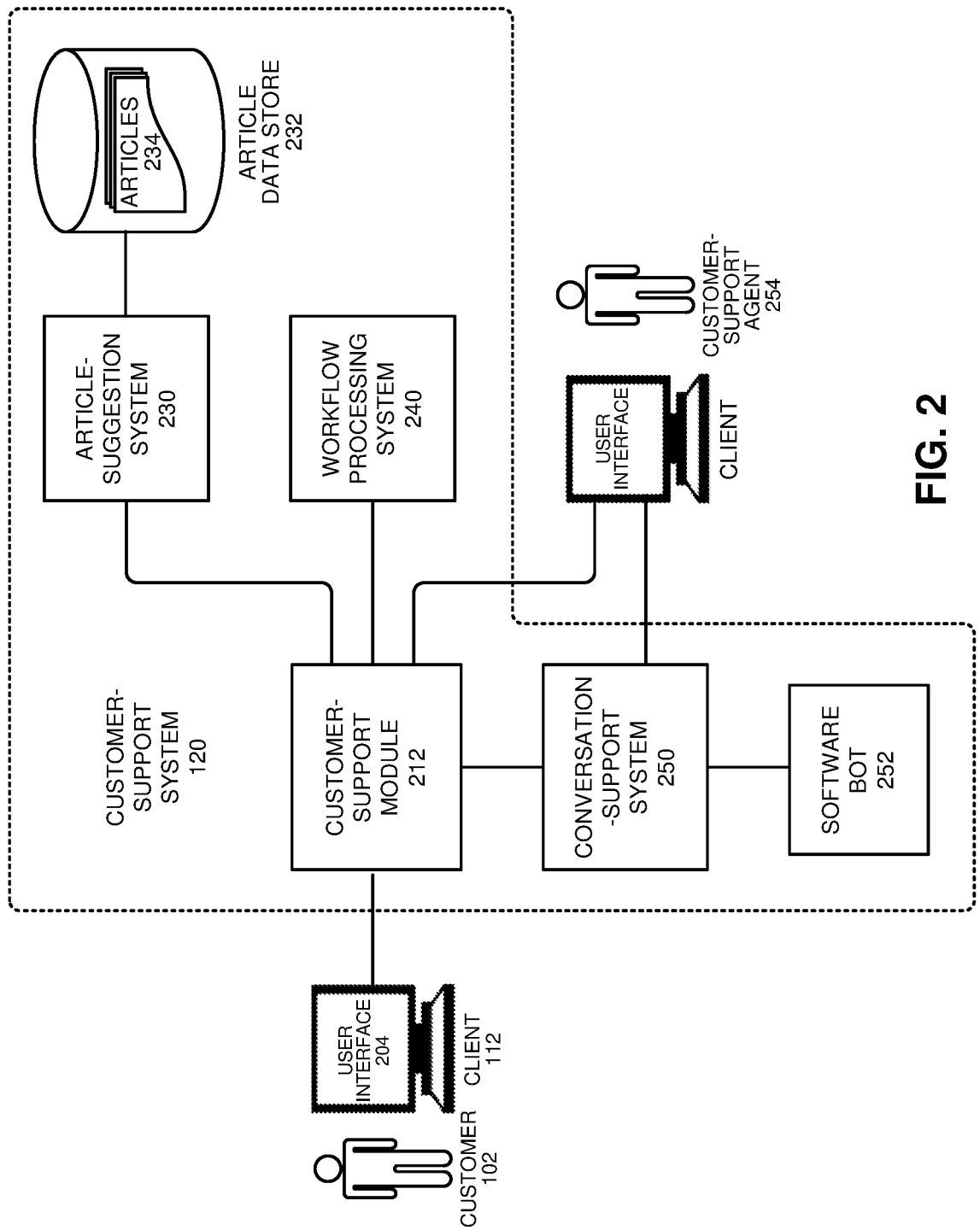
FIG. 2 illustrates the structure of the customer-support system in accordance with the disclosed embodiments.

FIG. 2 illustrates how a customer interacts with customer-support system 120 in accordance with the disclosed embodiments. During operation, a customer 102 who has an issue with a product or a service associated with application 124, interacts with customer-support system 120 through a user interface 204 in a client system 112. During this process, customer 102 submits a request to customer-support system 120 to obtain help with the issue, thereby initiating an automated customer-support conversation.

The request from customer 102 is directed to a customer-support module 212 within customer-support system 120. Customer-support module 212 can trigger various responsive customer-support actions, which will hopefully resolve the customer's issue. For example, customer-support module 212 can cause customer 102 to receive one or more helpful articles from an article-suggestion system 230 to facilitate resolving the customer's issue. During this process, article-suggestion system 230 obtains the one or more helpful articles from a set of help center articles 234 contained in an article data store 232.

Customer-support module 212 can alternatively trigger a predefined workflow from workflow processing system 240 to help resolve the customer's issue. Note that a predefined workflow orchestrates a sequence of interactions between the system and the customer to accomplish a given task, such as issuing a refund. For example, the predefined workflow can be associated with one or more of the following: obtaining status information for an order; changing a delivery address for an order; issuing a refund for an order; issuing an exchange for an order; resetting the customer's password; updating details of the customer's account; and canceling the customer's account.

Customer-support module 212 can also trigger a conversation-support system 250 to facilitate a customer-support conversation between customer 102 and a software bot 252 or a human customer-support agent 254 to help resolve the customer's issue. The structure of conversation-support system 250 is described in more detail below.

Conversation-Support System

Figure 3:
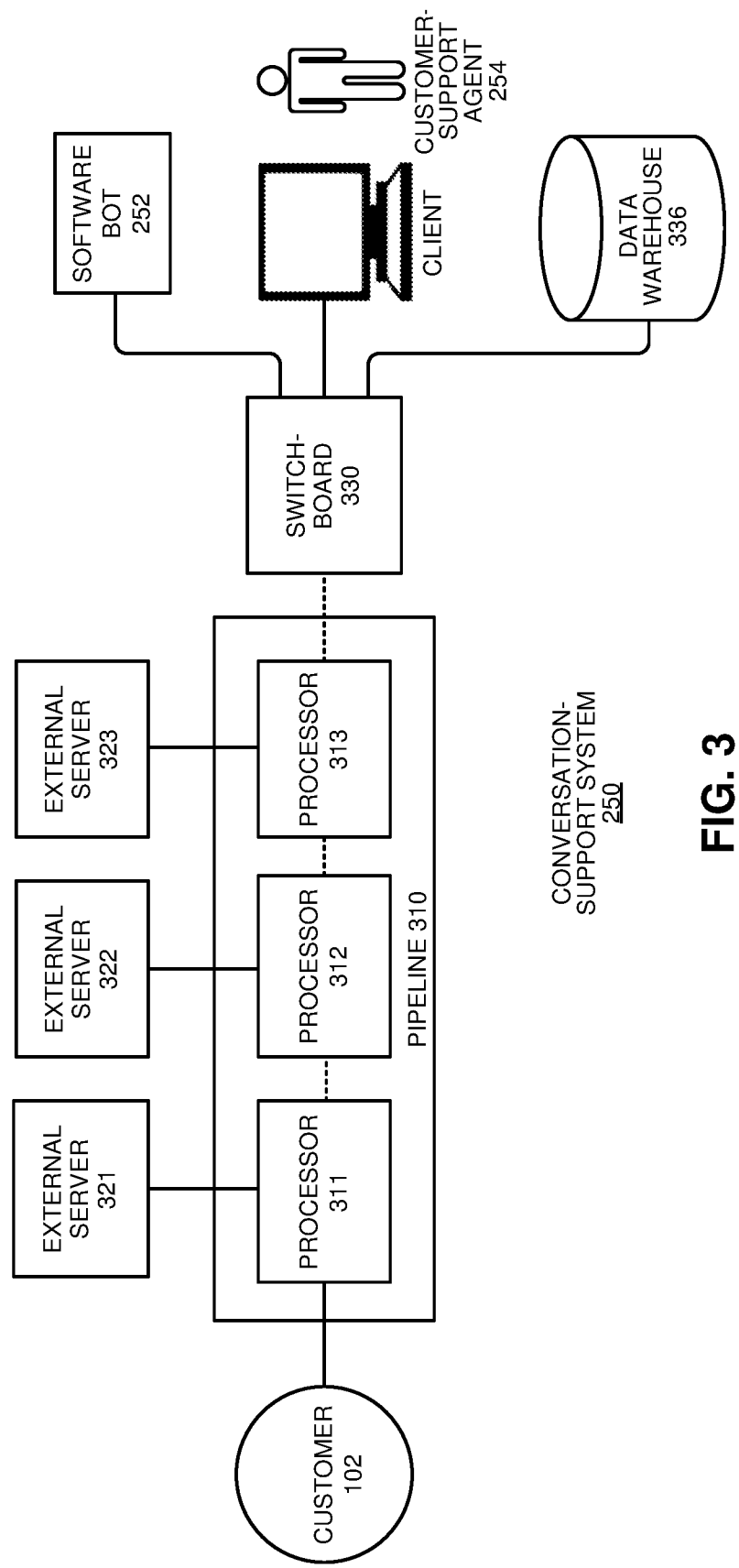
FIG. 3 illustrates an exemplary conversation-support system in accordance with the disclosed embodiments.

FIG. 3 illustrates the structure of conversation-support system 250 in accordance with the disclosed embodiments. Referring back to FIG. 1, a customer 102 who has an issue with application 124 accesses customer-support system 120 to obtain help with the issue. During this process, customer 102 submits a request to customer-support system 120 to obtain help with the issue, thereby initiating an automated customer-support conversation, which is handled by a conversation-support system 250 as is illustrated in FIG. 2.

Referring to FIG. 3, the customer-support conversation passes through a pipeline 310 and a switchboard 330, which directs messages in the conversation to a software bot 252, a human customer-support agent 254, or a data warehouse 336. During this process, pipeline 310, which is comprised of a sequence of processors 311-313, performs various operations on messages in the conversation. Each of the processors 311-313 is configured to make a call to an associated external server (such as a third-party server) to perform an operation on the message before forwarding the message to a subsequent stage of the pipeline. More specifically, processor 311 calls external server 321, processor 312 calls external server 322, and processor 313 calls external server 323. As mentioned above, these external servers can perform various operations on a message, such as performing a language translation operation on text in the message; retrieving additional information associated with the message from one or more sources; and masking out PII in the message.

Note that the disclosed pipeline system is not necessarily limited to working with external servers, such as third party servers. In other embodiments, the system can operate using first-party processors, which can be obtained in the marketplace, or through cloud code, which facilitates synchronous execution of processors.

During the customer-support conversation, switchboard 330 passes control of the conversation among one or more entities, which are responsible for responding to the customer during the conversation, such as software bot 252, human customer-support agent 254, or data warehouse 336. The actions of switchboard 330 are triggered by specific commands, which are inserted into messages by parties to the conversation as is described in more detail below.

Pipeline

In the exemplary embodiment of pipeline 310 illustrated in FIG. 3, messages in a customer-support conversation are formatted in accordance with the Hypertext Transfer Protocol (HTTP). (However, in general, the present invention can be used with many different types of communication protocols, and is not meant to be limited to HTTP.)

Pipeline 310 is initially configured by an "integrator." While configuring pipeline 310, the integrator may choose to install one or more middleware processors 311-313 to execute in a specified sequence in response to a given event. While doing so, the integrator first creates a processor that specifies the location of a corresponding external server (such as a third-party server). The integrator may then add the processor to one or more pipelines, and choose in which order it executes relative to the other processors in the pipeline. (Note that the term "processor" in this context does not refer to a physically embodied hardware processor, but instead refers to a software entity that calls an external server.)

In FIG. 3, processors 311-313 in the pipeline 310 are linked to each other and to switchboard 330 through dashed lines. These dashed lines represent the flow of messages between processors 311-313 and switchboard. However, these entities are not actually connected to each other. Processors 311-313 do not know about each other and are atomic, independent units. Each of the processors 311-313 is actually connected to a conversation platform, which is part of conversation-support system 250. When a message is initially sent by customer 102, the message is first sent to the conversation platform, which looks up the pipeline for a given account and then delivers the message to the first configured processor in the pipeline. That processor has the ability to process the message and discard it, so it will not propagate any further. Or, it may process the message and send it back to the conversation platform using a "continue"

instruction, which tells the conversation platform to take the newly processed message and deliver it to the next processor in the pipeline.

Pipeline 310 executes in response to a conversational event, such as a message from a customer, a message from a business, or a typing indicator. When an event is triggered, the first processor in the associated pipeline is notified via an HTTP POST. The processor then has the opportunity to process the contents of the message, fetching additional information about the user or conversation if necessary. The processor may then either: (1) perform no further action, which causes the pipeline to halt and not continue to propagate messages to further listeners; or (2) make an HTTP POST request to a "continue message endpoint" to continue the journey of the message through the pipeline, optionally supplying metadata that other listeners may find useful. In case (1) above, the message is swallowed by the processor and does not propagate through the rest of the pipeline. In case (2), the message is delivered to the second processor in the pipeline (including any metadata that the first processor may have provided). The message proceeds in this way until all processors in the pipeline have been exhausted, or until a processor decides to swallow the message.

If a message makes it to the end of a pipeline successfully (i.e., without being swallowed by any of its processors), it is forwarded to any passive listeners that the application has configured. These passive listeners can include traditional webhooks and third-party business systems, such as Slack™ or Zendesk™. Note that switchboard 300 may optionally be configured to manage control of the conversation between connected passive listeners.

While configuring pipeline 310, the integrator can make use of a pipeline-specific API, which enables the integrator to perform various configuration operations, such as: creating a processor; listing processors; getting a processor; updating a processor; deleting a processor; listing pipelines; updating a pipeline; and continuing a message from a processor to a subsequent stage in the pipeline. (Further details of this API are described in U.S. Provisional Application No. 63/023,588, entitled "Facilitating Customer-Support Conversations" by inventors Michael Gozzo, Andrew Lavers, Jean-Philippe J. Joyal, Michael J. Spensieri, Francois U. Brien and Marc-Antoine Leblond filed on 12 May 2020, which is hereby incorporated by reference herein.)

Switchboard

As mentioned above, customer-support systems often facilitate conversations between a customer and a customer-support agent (or a software bot) to help resolve a customer's problem. During such conversations, customer-support systems commonly use a front-line software bot to automate the resolution of common requests, while escalating requests that the bot cannot handle to human customer-support agents.

In classic telephone networks, the two parties to a conversation were connected when an operator connected a wire between each of their telephones on the network. Switchboard 330 works in a similar fashion. Switchboard 330 can be configured to only send events for a customer-support conversation to a system that is currently designated as "active," effectively connecting a wire between the system and the conversation. Moreover, switchboard 330 keeps track of which business system is currently active for each conversation it manages. Note that the systems associated with switchboard 330 do not need to know about each other (or even be aware of switchboard 330). Either they will receive events if they are the active system, or they will not.

Any system associated with switchboard 330 can issue three types of conversation-control commands: (1) a pass-control command that passes control of the conversation to another system; (2) an offer-control command that offers control of the conversation to another system; and (3) a take-control command that takes control of a conversation that is offered. Exemplary syntax for these types of conversation-control commands are illustrated in the table in FIG. 4. Note that these commands can be inserted into a message through one of the following means: a human customer-support agent who manually inserts the command; a human customer-support agent who executes a macro that includes the command; a trigger or purpose-built UI, which automatically inserts the command; and a bot that executes a script, which includes the command.

Figure 5:
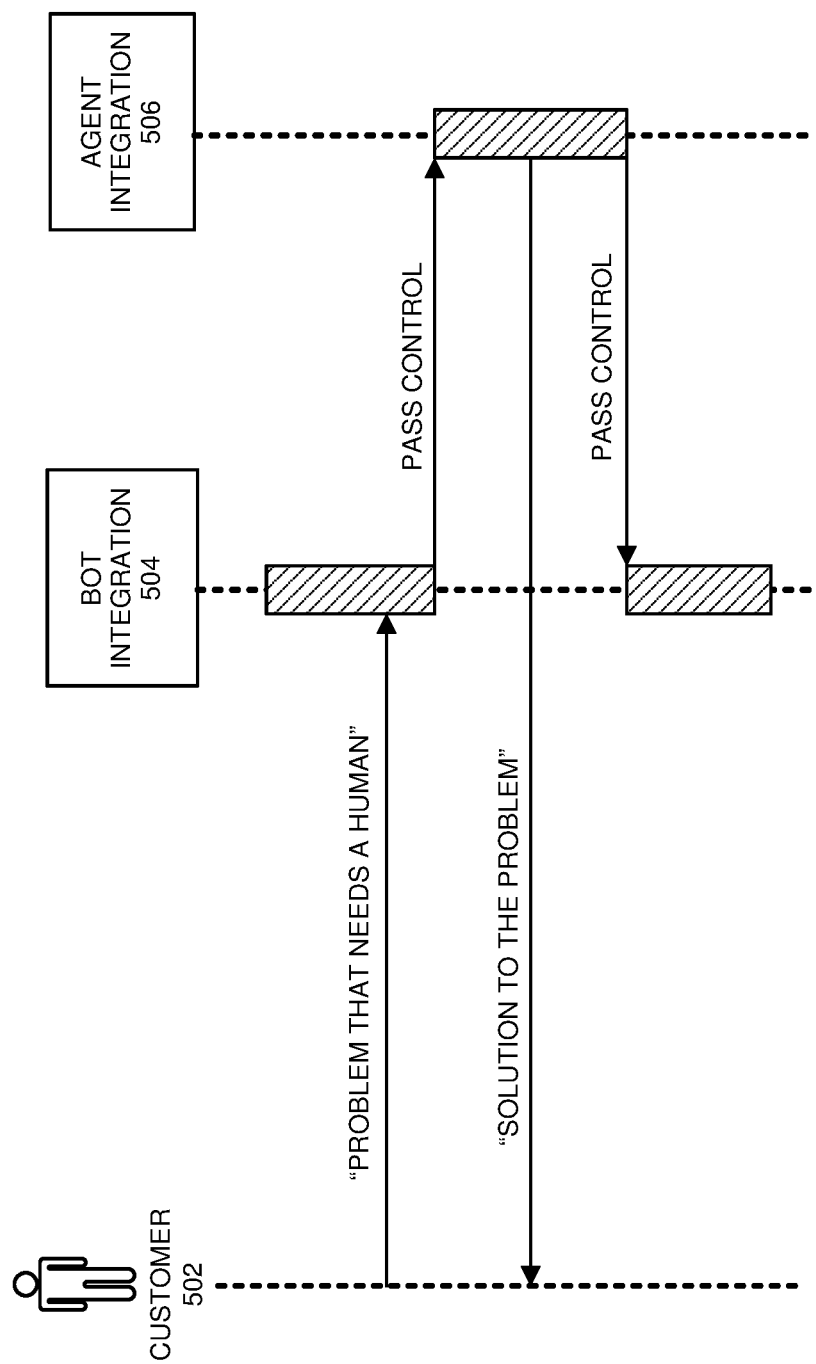
FIG. 5 illustrates how control of a conversation can be passed between a bot integration and an agent integration in accordance with the disclosed embodiments.

As an example, FIG. 5 illustrates how control of a conversation can be passed between a bot and a human customer-support agent. In the example illustrated in FIG. 5, a business is represented by two different switchboard integrations: a bot integration 504, which facilitates communication with a software bot, and an agent integration 506, which facilitates communication with a human customer-support agent. When customer 502 first reaches out, the customer's messages are initially routed to the bot integration 504. When the user asks a question that the associated software bot cannot handle, bot integration 504 passes control of the conversation to the agent integration 506.

More specifically, as illustrated in FIG. 5, upon encountering a "problem that needs a human," bot integration 504 determines that escalation is required, and consequently passes control to agent integration 506, which immediately becomes the active system. Next, a human customer-support agent provides a "solution to the problem" via communications through agent integration 506. Agent integration 506 then passes control of the conversation to bot integration 504, which becomes the active system and receives future conversation events. Also, the associated customer-support ticket will be closed.

A more natural, seamless bot-agent handoff can be implemented by introducing two new commands: offer-control and take-control. In this scenario, instead of abruptly passing the control of a conversation to agent integration 506 and disconnecting itself, bot integration 504 instead offers control of the conversation to agent integration 506, while remaining an active participant in the conversation. Note that while the customer 502 waits for a human customer-support agent, they may continue to interact with the bot integration 504. Once an associated human customer-support agent joins the ticket, agent integration 506 can issue a take-control command, which removes control from bot integration 504 and assigns it solely to agent integration 506. Finally, after the problem is resolved, the agent can close the ticket, and agent integration 506 can issue a pass-control command to restore bot control.

Figure 6:
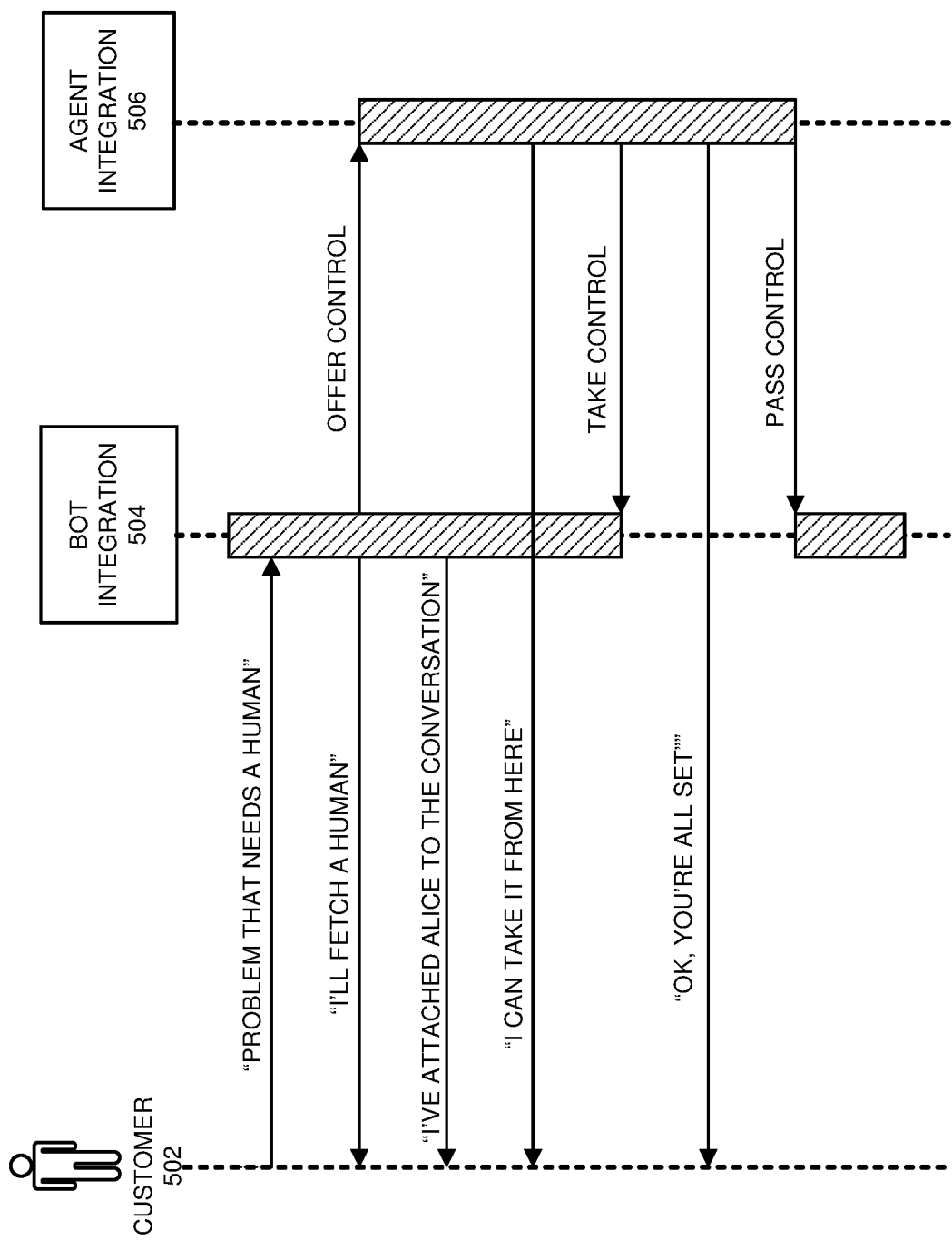
FIG. 6 illustrates how control of a conversation can be passed between a bot integration and an agent integration in a manner that achieves a warmer transfer in accordance with the disclosed embodiments.

More specifically, referring to FIG. 6, upon encountering a "problem that needs a human," bot integration 504 determines that escalation is required. This causes bot integration 504 to offer control to agent integration 506, and to notify customer 502 with a message saying "I'll fetch a human." In addition to receiving the offer of control, agent integration 506 immediately becomes an active system that shares control of the conversation with bot integration 504. Bot integration 504 also informs customer 502 about the escalation by sending a message saying "I've attached Alice to the conversation." The human customer-support agent, Alice, then sends a message to customer 502 saying "I can take it from here," and uses the take-control command to take exclusive control of the conversation. After the issue is resolved, Alice sends a message to customer 502 saying "OK, you're all set," and agent integration 506 passes control of the conversation back to the bot integration 504. This causes bot integration 504 to regain control of the conversation and to receive future conversation events.

Switchboards and Integrations

A switchboard comprises a group of integrations that can share or transfer control of a conversation between each other. For each conversation, all switchboard integrations have an associated status of either active or standby. The difference between active and standby status is a matter of signaling; an active switchboard integration is expected to respond to user messages, while a standby integration is not. More than one switchboard integration may be active at the same time. The order in which switchboard integrations become active determines precedence.

Within the switchboard system 330, integrations provide a vehicle for sending and receiving messages from third-party business systems and bots. These integrations come in the form of "native integrations" baked into the conversation-support system 250, or as "custom integrations" that communicate via a conversations API and webhooks. (An exemplary conversations API is described in U.S. Provisional Application No. 63/023,588, entitled "Facilitating Customer-Support Conversations" by inventors Michael Gozzo, Andrew Lavers, Jean-Philippe J. Joyal, Michael J. Spensieri, Francois U. Brien and Marc-Antoine Leblond filed on 12 May 2020, which is hereby incorporated by reference herein.)

A switchboard integration represents an integration's membership within a switchboard, as well as its presence and status in an ongoing conversation. Moreover, integrations can live on their own, without being a member of a switchboard. An integration that is not part of a switchboard will simply receive subscribed message events as if the switchboard did not exist. However, a switchboard integration requires an attached integration in order to send and receive messages. Also, switchboard integrations may opt to receive events even when they are in standby mode. This allows integrations to keep track of conversation events so that they have context on hand if and when they are switched to active status for a given conversation.

Control Transfer

Switchboards can designate one integration as the "default" integration. When a new conversation begins, this default integration will begin with active status for that conversation. When a switchboard integration wishes to transfer control to another integration, they may determine which other integrations are involved in a conversation, but they do not need to. Switchboard configuration includes a "default transfer path graph," which specifies default transfer paths between switchboard integrations. Thus, a switchboard integration may transfer control of a conversation by issuing a pass-control command or offer-control command without having to name any specific switchboard integration.

Figure 7:
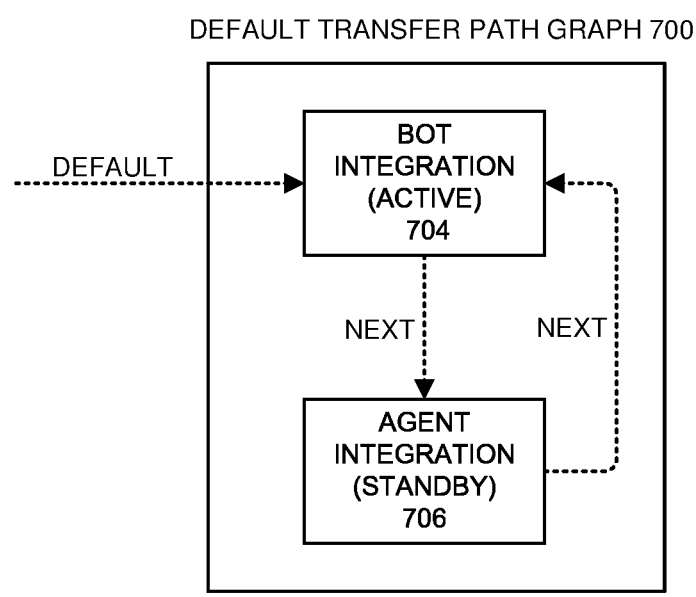
FIG. 7 illustrates an exemplary default transfer path graph in accordance with the disclosed embodiments.

For example, an exemplary default transfer path graph 700 is illustrated in FIG. 7. In this graph, the bot integration 704 is designated as the default integration, and control is automatically alternated between the bot integration 704 and an associated agent integration 706.

Processing a Message during a Customer-Support Conversation

Figure 8:
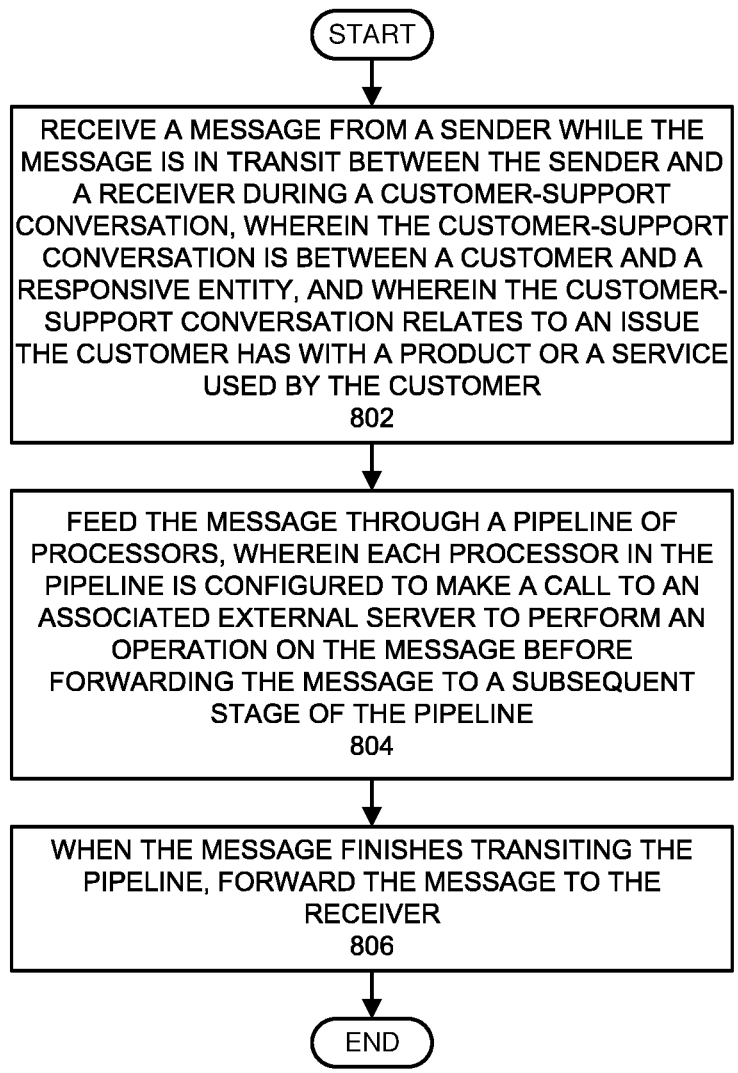
FIG. 8 presents a flow chart illustrating operations performed while processing a message during a customer-support conversation in accordance with the disclosed embodiments.

FIG. 8 presents a flow chart illustrating operations performed while processing a message during a customer-support conversation in accordance with the disclosed embodiments. During operation, the system receives a message from a sender while the message is in transit between the sender and a receiver during a customer-support conversation, wherein the customer-support conversation is between a customer and a responsive entity, and wherein the customer-support conversation relates to an issue the customer has with a product or a service used by the customer (step 802). Next, the system feeds the message through a pipeline of processors, wherein each processor in the pipeline is configured to make a call to an associated external server to perform an operation on the message before forwarding the message to a subsequent stage of the pipeline (step 804). Finally, when the message finishes transiting the pipeline, the system forwards the message to the receiver (step 806).

Passing Control of a Customer-Support Conversation Among Integrations

Figure 9:
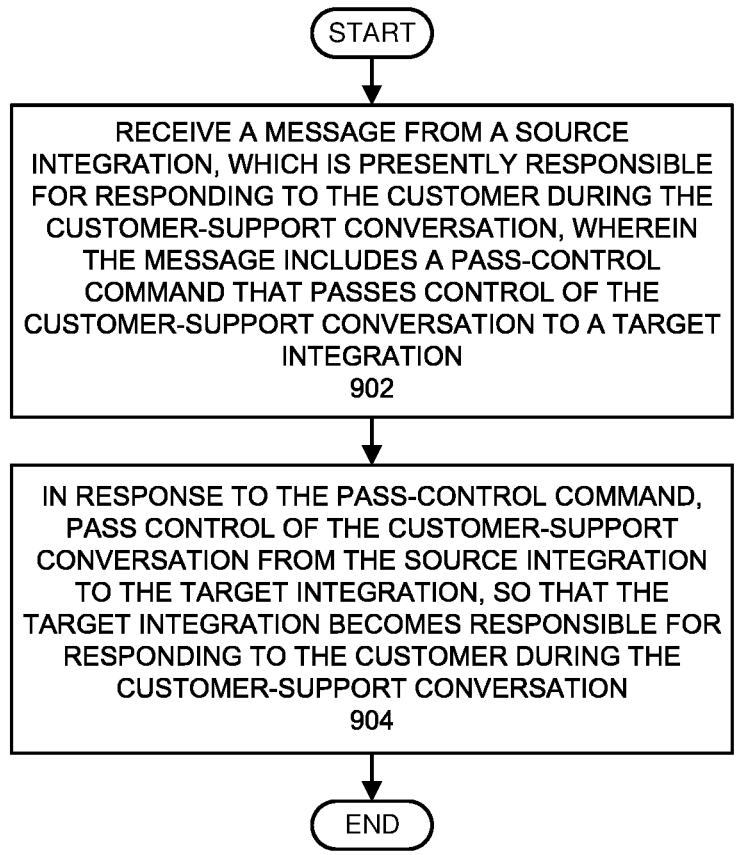
FIG. 9 presents a flow chart illustrating operations performed while passing control of a customer-support conversation system among integrations, which are responsible for responding to a customer during the customer-support conversation, in accordance with the disclosed embodiments.

FIG. 9 presents a flow chart illustrating operations performed while passing control of a customer-support conversation system among integrations, which are responsible for responding to a customer during the customer-support conversation. During operation, the system receives a message from a source integration, which is presently responsible for responding to the customer during the customer-support conversation, wherein the message includes a pass-control command that passes control of the customer-support conversation to a target integration (step 902). In response to the pass-control command, the system passes control of the customer-support conversation from the source integration to the target integration, so that the target integration becomes responsible for responding to the customer during the customer-support conversation (step 904).

Note that in some cases, it is possible to encounter an infinite switch loop. For example, referring to the default transfer path graph 700 illustrated in FIG. 7, if each of the integrations 704 and 706 responds to receiving control by immediately passing control to the next default integration, then the two integrations 704 and 706 will be in an infinite loop. To remedy this problem, we can impose an application-level switch rate limit. (Note that this rate limit cannot be enforced at the API level because switching can be triggered via syntax.) To implement this switch rate limit, we can increment a variable, which is associated a time-to-live (TTL) key, every time a switch is made. For example, if we detect that a conversation switch has been triggered more than 30 times in a span of 60 seconds, we can reject the switch attempt trigger and error notification.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for accessing external servers to process messages during customer-support conversations in an online customer-support system, the method comprising:
   receiving a message from a sender while the message is in transit between the sender and a receiver during a customer-support conversation, wherein the customer-support conversation is between a customer and a responsive entity, wherein the sender is one of the customer and the responsive entity, wherein the receiver is the other of the customer and the responsive entity, and wherein the customer-support conversation relates to an issue the customer has with a product or a service used by the customer;
   feeding the message through a pipeline of software-based message processors, wherein each software-based message processor in the pipeline is configured to make a program call to an associated external server to perform an operation on the message before forwarding the message to a subsequent stage of the pipeline; and
   when the message finishes transiting the pipeline, forwarding the message to the receiver.

2. The method of claim 1, wherein external servers can perform the following operations on a message:
   perform a language translation operation on text in the message;
   retrieve additional information associated with the message from one or more sources; and
   mask out personally identifiable information (PII) in the message.

3. The method of claim 1, wherein the responsive entity in the customer-support conversation includes one of the following:
   a customer-support agent; and
   a software bot.

4. The method of claim 1, wherein the message comprises a Hypertext Transfer Protocol (HTTP) message or event.

5. The method of claim 1, wherein while processing the message, each software-based message processor in the pipeline may retrieve additional information associated with the customer-support conversation and/or the customer.

6. The method of claim 1, wherein when a software-based message processor makes a program call to an external server, the software-based message processor also communicates a secret to the external server, wherein the secret enables the external server to verify the origin of the call.

7. The method of claim 1, wherein a software-based message processor in the pipeline may selectively halt the message so that the message does not continue propagating through the pipeline.

8. The method of claim 1, wherein when a software-based message processor makes a program call to an external server, the software-based message processor also communicates a one-time use "nonce" to the external server, wherein the nonce enables the external server to forward the message to a subsequent stage of the pipeline.

9. The method of claim 1, wherein each software-based message processor in the pipeline can attach metadata to the message before forwarding the message to a subsequent stage of the pipeline.

10. The method of claim 1, wherein after the message finishes transiting the pipeline, in addition to forwarding the message to the receiver, the method further comprises forwarding the message to one or more of:
    a traditional webhook; and
    a third-party business system.

11. The method of claim 1, wherein prior to receiving the message, the method further comprises exposing an application programming interface (API) configured to, when executed:
    create a software-based message processor; and
    update a pipeline to include the software-based message processor at a specific location in the pipeline.

12. The method of claim 11, wherein the API defines calls for the following operations:
    creating a software-based message processor;
    listing software-based message processors;
    getting a software-based message processor;
    updating a software-based message processor;
    deleting a software-based message processor;
    listing pipelines;
    updating a pipeline; and
    continuing a message from a software-based message processor to a subsequent stage in the pipeline.

13. A non-transitory computer-readable storage medium storing instructions that when executed by a computer cause the computer to perform a method for accessing external servers to process messages during customer-support conversations in an online customer-support system, the method comprising:
    receiving a message from a sender while the message is in transit between the sender and a receiver during a customer-support conversation, wherein the customer-support conversation is between a customer and a responsive entity, wherein the sender is one of the customer and the responsive entity, wherein the receiver is the other of the customer and the responsive entity, and wherein the customer-support conversation relates to an issue the customer has with a product or a service used by the customer;
    feeding the message through a pipeline of software-based message processors, wherein each software-based message processor in the pipeline is configured to make a program call to an associated external server to perform an operation on the message before forwarding the message to a subsequent stage of the pipeline; and
    when the message finishes transiting the pipeline, forwarding the message to the receiver.

14. The non-transitory computer-readable storage medium of claim 13, wherein external servers can perform the following operations on a message:
    perform a language translation operation on text in the message;
    retrieve additional information associated with the message from one or more sources; and
    mask out personally identifiable information (PII) in the message.

15. The non-transitory computer-readable storage medium of claim 13, wherein the responsive entity in the customer-support conversation includes one of the following:
    a customer-support agent; and
    a software bot.

16. The non-transitory computer-readable storage medium of claim 13, wherein the message comprises a Hypertext Transfer Protocol (HTTP) message or event.

17. The non-transitory computer-readable storage medium of claim 13, wherein while processing the message, each software-based message processor in the pipeline may retrieve additional information associated with the customer-support conversation and/or the customer.

18. The non-transitory computer-readable storage medium of claim 13, wherein when a software-based message processor makes a program call to an external server, the software-based message processor also communicates a secret to the external server, wherein the secret enables the external server to verify the origin of the call.

19. The non-transitory computer-readable storage medium of claim 13, wherein a software-based message processor in the pipeline may selectively halt the message so that the message does not continue propagating through the pipeline.

20. The non-transitory computer-readable storage medium of claim 13, wherein when a software-based message processor makes a program call to an external server, the software-based message processor also communicates a one-time use "nonce" to the external server, wherein the nonce enables the external server to forward the message to a subsequent stage of the pipeline.

21. The non-transitory computer-readable storage medium of claim 13, wherein each software-based message processor in the pipeline can attach metadata to the message before forwarding the message to a subsequent stage of the pipeline.

22. The non-transitory computer-readable storage medium of claim 13, wherein after the message finishes transiting the pipeline, in addition to forwarding the message to the receiver, the method further comprises forwarding the message to one or more of:
 a traditional webhook; and
 a third-party business system.

23. The non-transitory computer-readable storage medium of claim 13, wherein prior to receiving the message, the method further comprises exposing an application programming interface (API) configured to, when executed:
 create a software-based message processor; and
 update a pipeline to include the software-based message processor at a specific location in the pipeline.

24. The non-transitory computer-readable storage medium of claim 23, wherein the API defines calls for the following operations:
 creating a software-based message processor;
 listing software-based message processors;
 getting a software-based message processor;
 updating a software-based message processor;
 deleting a software-based message processor;
 listing pipelines;
 updating a pipeline; and
 continuing a message from a software-based message processor to a subsequent stage in the pipeline.

25. A system that facilitates accessing external servers to process messages during customer-support conversations in an online customer-support system, comprising:
 at least one hardware processor and at least one associated memory; and
 a message-processing mechanism, which executes on the at least one hardware processor, wherein during operation, the message-processing mechanism:
  receives a message from a sender while the message is in transit between the sender and a receiver during a customer-support conversation, wherein the customer-support conversation is between a customer and a responsive entity, wherein the sender is one of the customer and the responsive entity, wherein the receiver is the other of the customer and the responsive entity, and wherein the customer-support conversation relates to an issue the customer has with a product or a service used by the customer;
  feeds the message through a pipeline of software-based message processors, wherein each software-based message processor in the pipeline is configured to make a program call to an associated external server to perform an operation on the message before forwarding the message to a subsequent stage of the pipeline; and
  when the message finishes transiting the pipeline, forwards the message to the receiver.

26. The system of claim 25, wherein while processing the message, each software-based message processor in the pipeline may retrieve additional information associated with the customer-support conversation and/or the customer.

27. The system of claim 25, wherein a software-based message processor in the pipeline may selectively halt the message so that the message does not continue propagating through the pipeline.

28. The system of claim 25, wherein each software-based message processor in the pipeline can attach metadata to the message before forwarding the message to a subsequent stage of the pipeline.

29. The system of claim 25, wherein the system exposes an application programming interface (API) configured to, when executed:
 create a software-based message processor; and
 update a pipeline to include the software-based message processor at a specific location in the pipeline.

\* \* \* \* \*